Figure 1:
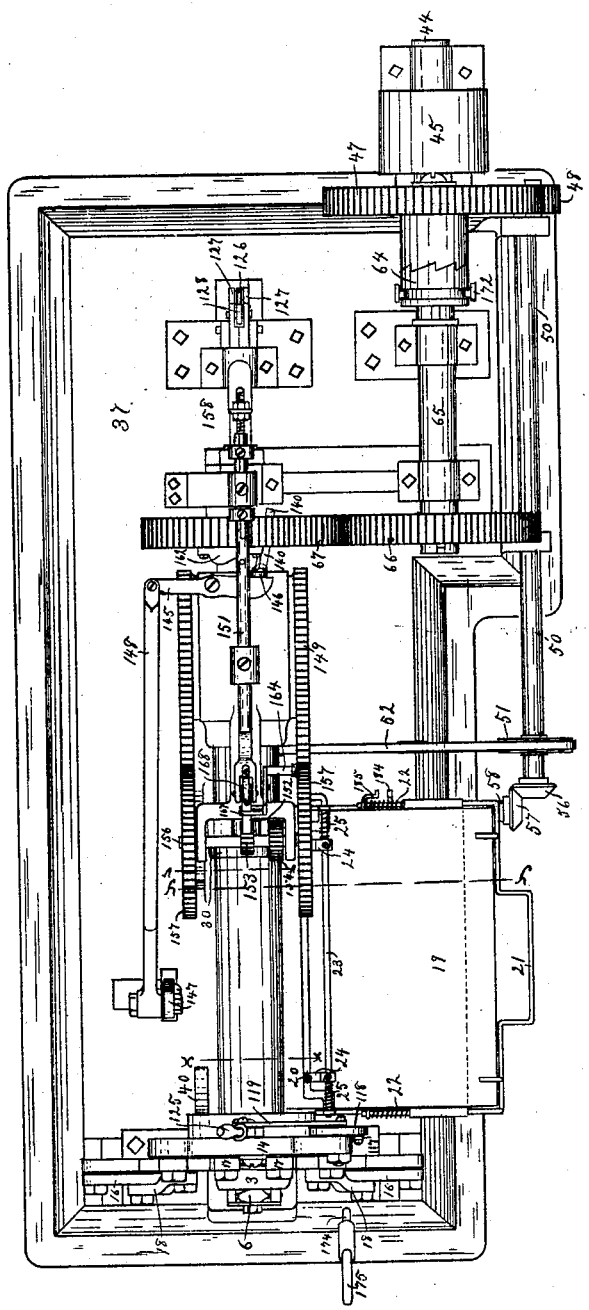

No. 643,913. Patented Feb. 20, 1900.
H. SEKOWSKY.
STOVEPIPE ELBOW MACHINE.
(Application filed June 5, 1899.)
(No Model.) 10 Sheets—Sheet 1.

Witnesses.

Inventor.
Hermann Sekowsky
By Erwin Wheeler & Wheeler
Attorneys

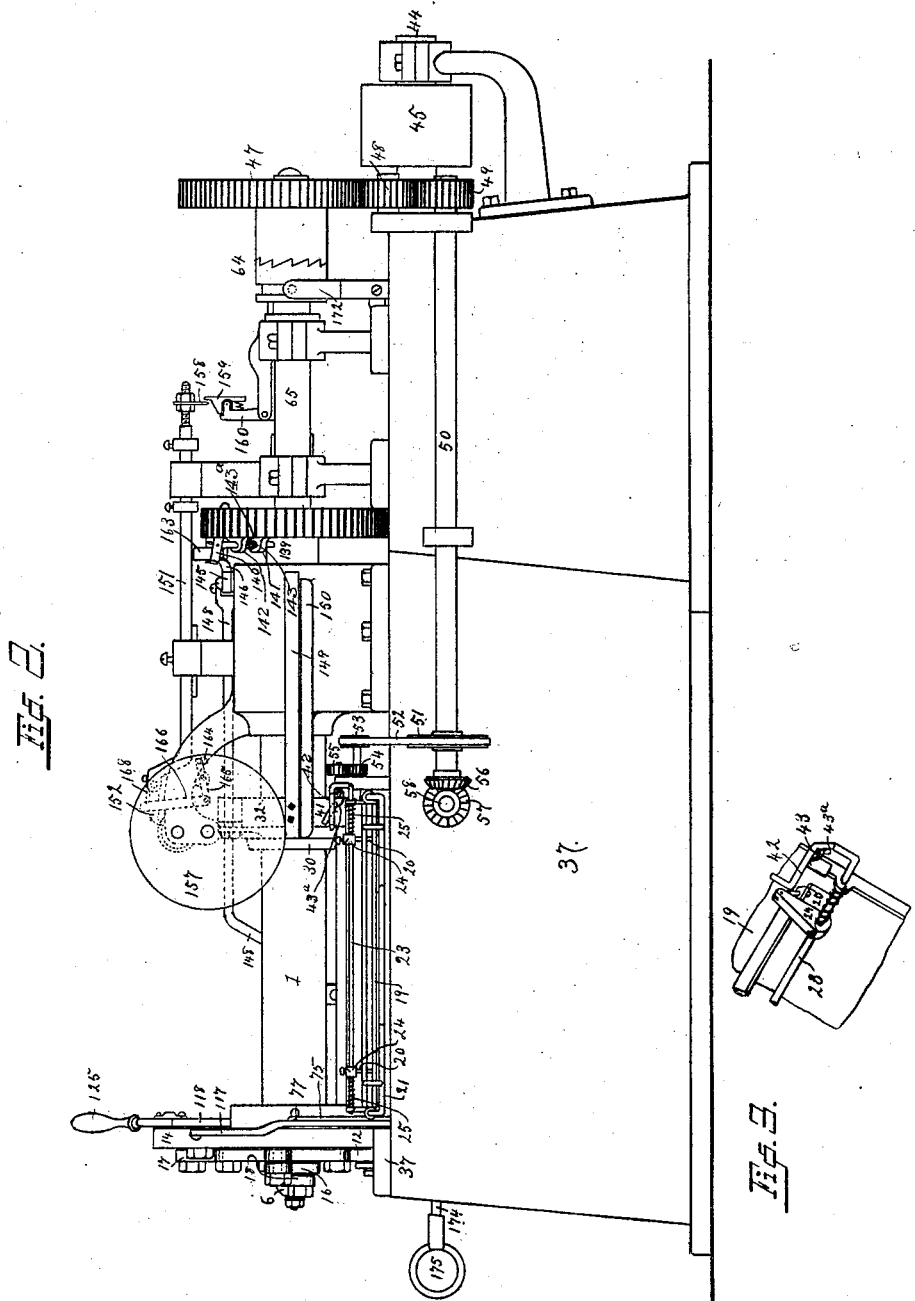

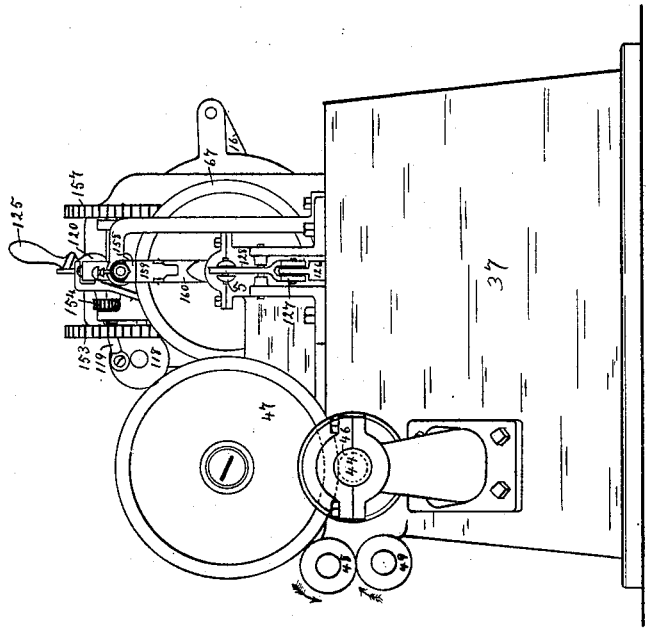

No. 643,913. Patented Feb. 20, 1900.
H. SEKOWSKY.
STOVEPIPE ELBOW MACHINE.
(Application filed June 5, 1899.)
(No Model.) 10 Sheets—Sheet 4.
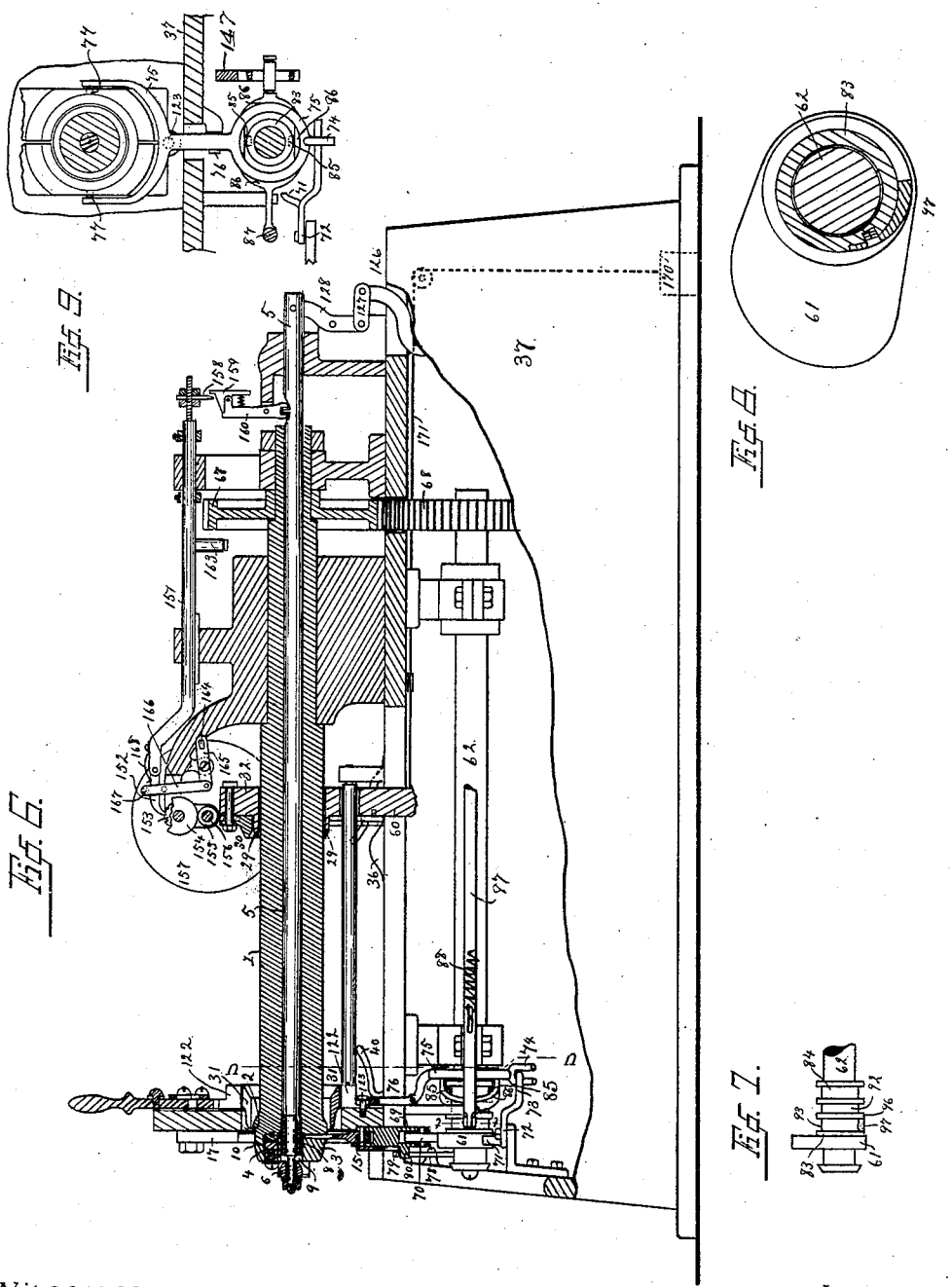
Witnesses
Inventor.
Hermann Sekowsky
By Erwin Wheeler & Wheeler
Attorneys No. 643,913. Patented Feb. 20, 1900.
H. SEKOWSKY.
STOVEPIPE ELBOW MACHINE.
(Application filed June 5, 1899.)
(No Model.) 10 Sheets—Sheet 5.

Witnesses.
Inventor.
Hermann Sekowsky
By Erwin Wheeler & Wheeler,
Attorneys

THE NORRIS PETERS CO., PHOTO-LITHO., WASHINGTON, D. C.

No. 643,913. Patented Feb. 20, 1900.
H. SEKOWSKY.
STOVEPIPE ELBOW MACHINE.
(Application filed June 5, 1899.)

(No Model.) 10 Sheets—Sheet 6.

Witnesses.

Inventor.
Hermann Sekowsky
By Erwin Wheeler & Wheeler
Attorneys

No. 643,913. Patented Feb. 20, 1900.
H. SEKOWSKY.
STOVEPIPE ELBOW MACHINE.
(Application filed June 5, 1899.)
(No Model.) 10 Sheets—Sheet 7.
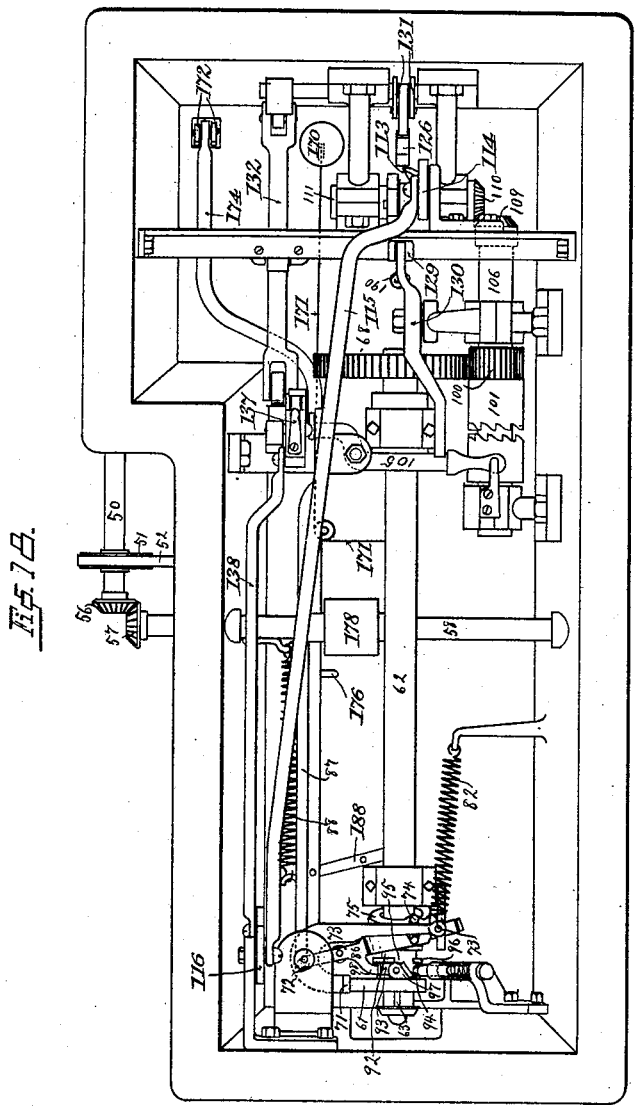
Witnesses. Inventor.
Hermann Sekowsky
By Erwin Wheeler & Wheeler
Attorneys No. 643,913. Patented Feb. 20, 1900.
H. SEKOWSKY.
STOVEPIPE ELBOW MACHINE.
(Application filed June 5, 1899.)
(No Model.) 10 Sheets—Sheet 8.
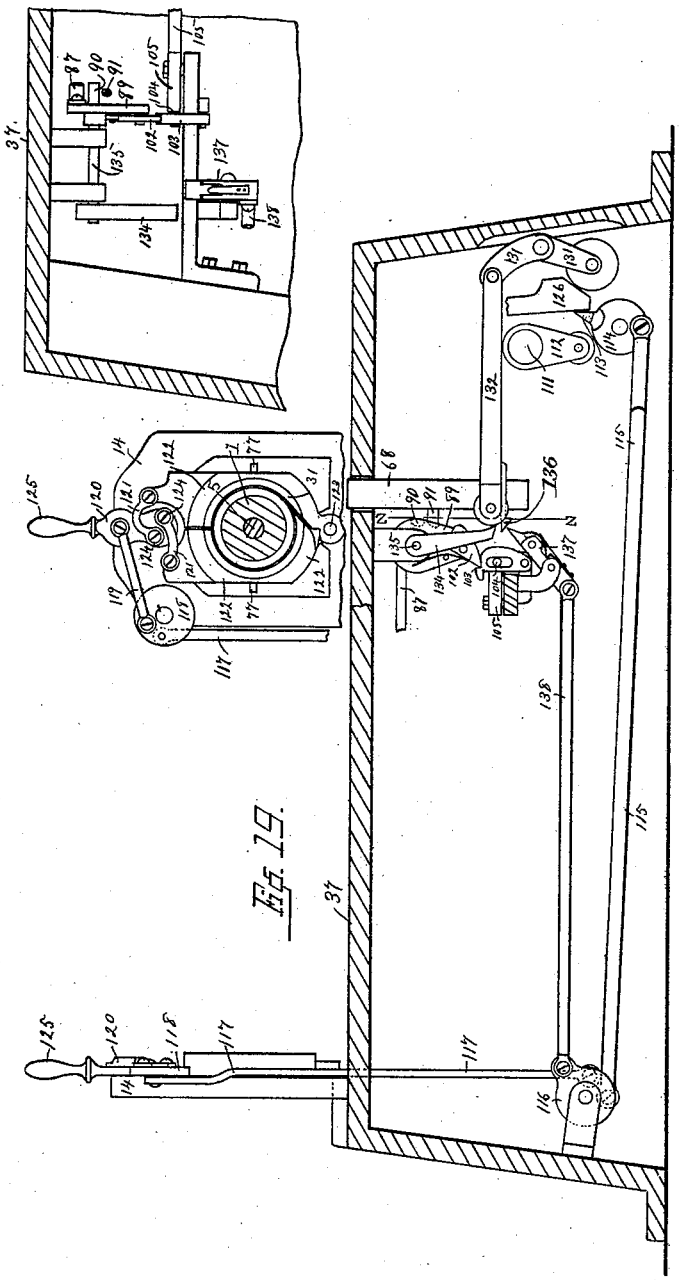
Witnesses
Inventor.
Hermann Sekowsky
By Erwin Wheeler & Wheeler
Attorneys

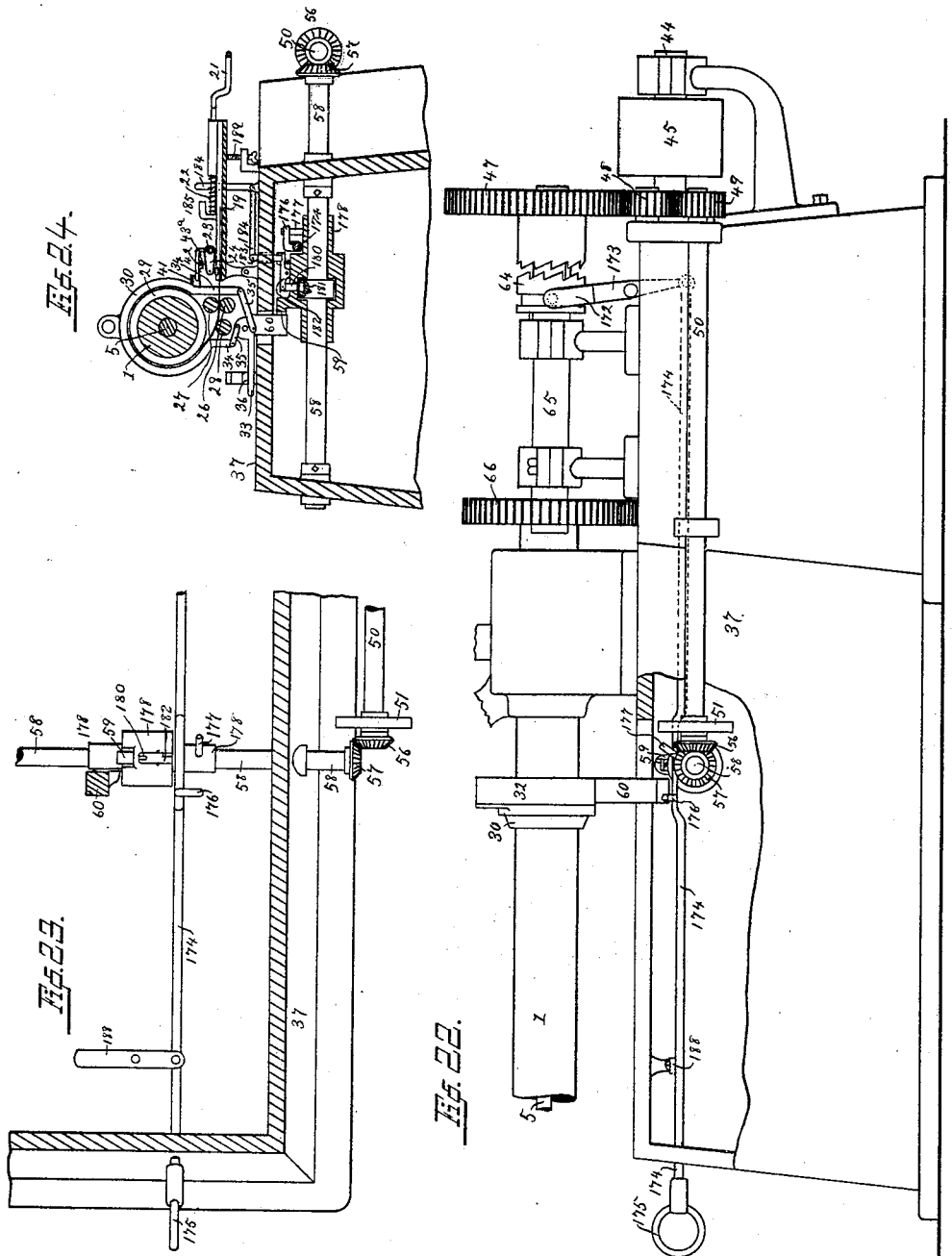

No. 643,913. Patented Feb. 20, 1900.
H. SEKOWSKY.
STOVEPIPE ELBOW MACHINE.
(Application filed June 5, 1899.)
(No Model.) 10 Sheets—Sheet 10.
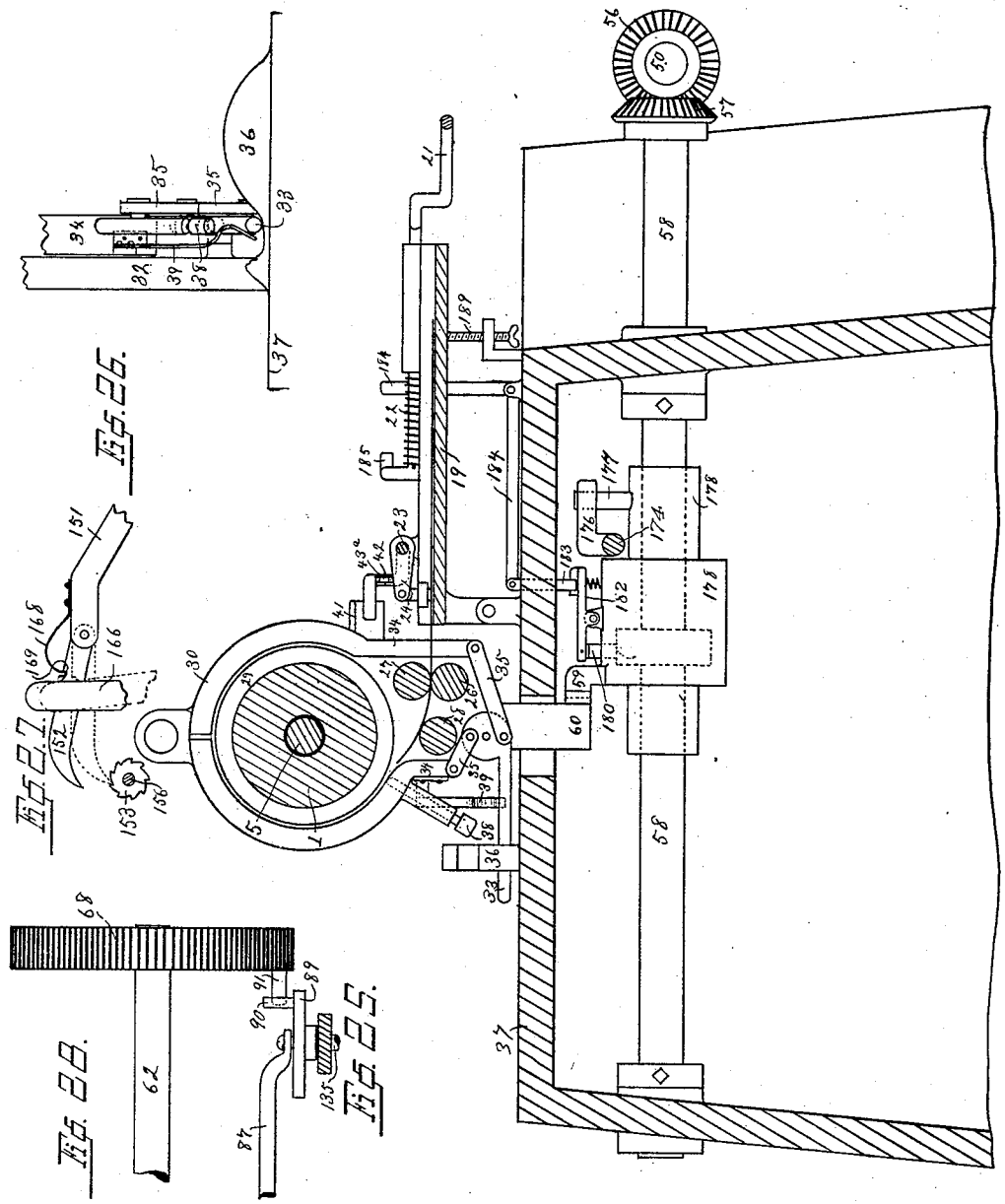
Witnesses. Inventor.
Hermann Sekowsky
By Erwin Wheeler & Wheeler
Attorneys

UNITED STATES PATENT OFFICE.

HERMANN SEKOWSKY, OF MILWAUKEE, WISCONSIN.

STOVEPIPE-ELBOW MACHINE.

SPECIFICATION forming part of Letters Patent No. 643,913, dated February 20, 1900.

Application filed June 5, 1899. Serial No. 719,447. (No model.)

*To all whom it may concern:*

Be it known that I, HERMANN SEKOWSKY, a citizen of the United States, residing at Milwaukee, in the county of Milwaukee and State of Wisconsin, have invented new and useful Improvements in Stovepipe-Elbow Machines, of which the following is a specification.

My invention relates to improvements in machines for making stovepipe-elbows.

The object of my invention is to provide a form of machine which will automatically form the blank or flat sheet of metal into a cylindrical pipe, successively crimp or crease the same eccentrically to form an elbow, press the sides of the inwardly-projecting plaits or creases together, and fold the same over upon the inner surface of the elbow in a continuous succession of operations; also, to provide means for automatically controlling the movement of the machine to stop the same after each elbow is completed and set in motion as the successive blanks are placed upon the feed-table by the operator, whereby the duties of such operator are reduced to the placing of the blanks upon the feed-table and the removal of the completed elbows from the machine.

In the following description reference is had to the accompanying drawings, in which—

Figure 12:
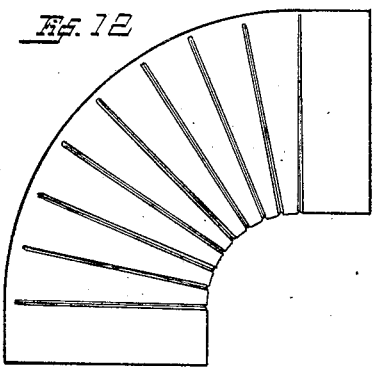
Figure 13:
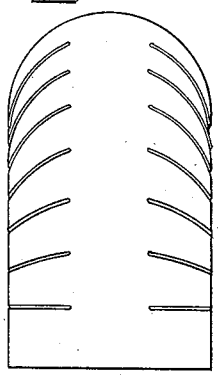
Figure 14:
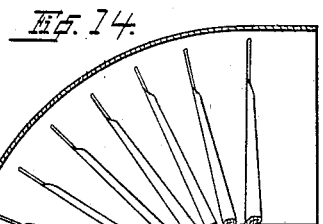
Figure 11:
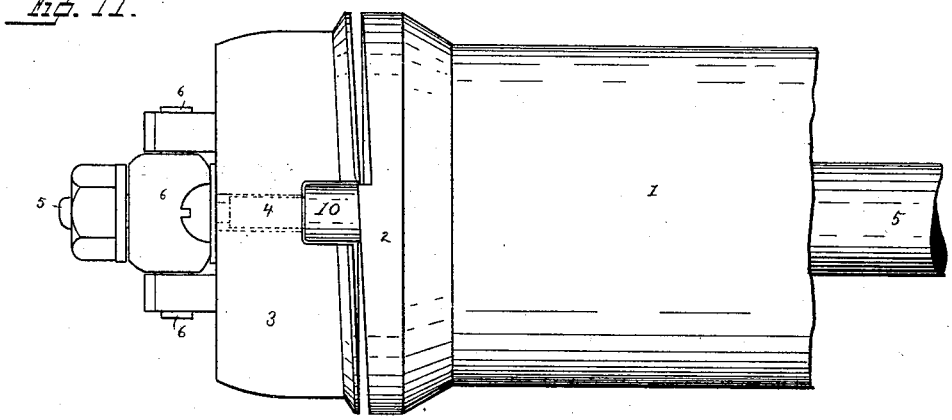
Figure 10:
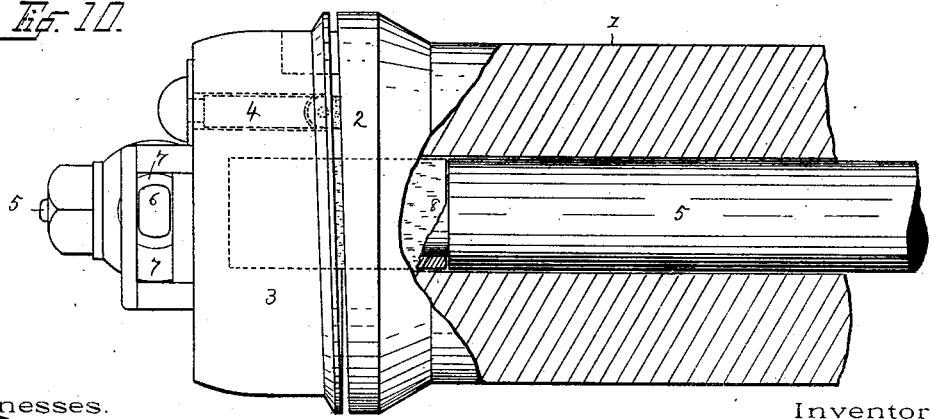

Figure 1 is a plan view of my invention. Fig. 2 is a side elevation of the same. Fig. 3 is a detail perspective view of the mechanism for actuating the blank-holding stops. Figs. 4 and 5 are elevations of the front and rear ends, respectively. Fig. 6 is a sectional view of that portion of the machine above the frame-body with a portion of the latter broken away to show the jaw-actuating mechanism at the front end of the machine and the parts directly connected therewith. Fig. 7 is a side view of the jaw-actuating cam and cam hub or sleeve. Fig. 8 is a cross-sectional view drawn on line T T of Fig. 6. Fig. 9 is a cross-sectional view drawn on line U U of Fig. 6, showing the cam-hub and shifting lever, together with the actuating-lever of the head-collar clamp, &c. Fig. 10 is an enlarged detail view of the head as seen from the side, the head being closed upon the shaft end. Fig. 11 is a top view of the same. Figs. 12, 13, and 14 are side, top, and sectional views of a completed elbow, illustrating the work done by the machine. Fig. 15 is a sectional view of the head-shaft and bending-rolls drawn on line V V of Fig. 1 and showing also the pipe-holder and its clamping-collar, together with the clamp-actuating mechanism. Fig. 16 is a detail side view of the pipe-holder and clamping-lever, showing the lever-actuating guides, together with the bending-rolls and a portion of the head-shaft, as seen from the opposite side from that occupied by the feed-table. Fig. 17 is a detail side view illustrating the mechanism for actuating the head to flatten the pipe crease or plait against the end of the head-shaft, together with the mechanism for folding the plait upon the interior surface of the pipe. Fig. 18 is a view of the machine as seen from the under side, showing the actuating mechanism located in the interior of the frame-body. Fig. 19 is a detail side view of the mechanism for actuating the clamping-arms of the head-collar. Fig. 20 is a sectional view drawn on line X X of Fig. 1, showing the head-frame, collar, and clamping mechanism, as seen from the rear. Fig. 21 is a detail sectional view drawn on line Z Z of Fig. 19. Fig. 22 is a detail side view of the clutch-actuating mechanism for starting and stopping the machine. Fig. 23 is a detail top view of a portion of the mechanism shown in Fig. 22, illustrating the relation of the cross-shaft to the clutch-actuating rod. Fig. 24 is a sectional view drawn on line Y Y of Fig. 1, illustrating the connection between the cross-shaft and blank-holder. Fig. 25 is an enlarged transverse sectional view drawn through the frame immediately in front of the cross-shaft 58 and also showing the pipe-holder. Fig. 26 is a detail side view of a portion of the pipe-holder, showing the punch and the lever-supporting spring. Fig. 27 is a detail view of the actuating-pawl 152 of the pipe-holder, showing the engagement of the holding-spring in the notch 169 when the pawl is in its raised position. Fig. 28 is a detail top view of the mechanism for actuating the rod 87 from the gear-wheel 68, showing one of the supporting-bearings of the shaft 135 in section.

Like parts are identified by the same reference-figures throughout the several views.

1 is a head-shaft around which the blank or piece of sheet metal from which the elbow is to be formed is rolled into cylindrical form, as hereinafter explained. The shaft is provided with an enlarged end 2, to which a head 3 is secured by means of a hinge-link 4 at one side of its center, as best shown in Fig. 6. A rod 5 extends through a longitudinal opening in the shaft 1 and is connected with the head 3 by means of a cross-head 6, which is engaged, Fig. 10, in slotted bearings 7 in the head, whereby the latter may be drawn centrally against the shaft 1 by a pull exerted by the rod 5 or separated eccentrically from the shaft end upon the pivotal connection of the link 4 when the rod 5 is moved forwardly.

To provide for the rotation of the head with the shaft without strain on the link 4 and rod 5, I have provided the shaft end with a bushing 8, squared on its exterior surface, Fig. 10, and projecting into a socket 9 in the head, which socket should be sufficiently large in its vertical diameter to permit the head to oscillate upon the link as a hinge without binding or cramping on the bushing 8. The opposing surfaces of the head and shaft end have a spiral trend, and the shaft end is provided with a lug 10, located on the shoulder formed by the spiral pitch of the end face and projecting into a counterpart recess in the head 3.

Crimping-jaws 12 and 13, Fig. 4, are secured to a head-frame 14 and are arranged in pairs, the two jaws 12 being hinged together at 15, directly under the line of the shaft and head, and connected at the sides with the head-frame 14 by lever 16. The jaws 13 are connected with the upper portion of the head-frame by arms 17 and with the lever 16 by links 18, the parts being so arranged and proportioned that the jaws 12 and levers 16 and also the jaws 13 and links 18 form an inwardly-moving toggle in each case, whereby an upward pressure exerted at the point of the hinged connection 15 of the jaws 12 will communicate motion to all the jaws to close them in the arc of a circle of larger diameter than that of the shaft or head, the center of which circle is above the center line of the shaft 1. As the jaws are arranged to register with the spiral opening between the head 3 and shaft end 2, they will when closed enter such opening on all sides except that occupied by the lug 10, which in the construction shown is on the upper side when the shaft 1 is at rest.

The material from which the elbow is to be formed is fed into the machine in the form of a flat sheet-metal blank of the required size for the formation of an elbow. This is placed on the feed-table 19, with its front edge bearing against the spring-actuated stop-pins 20 and its rear edge engaged by a blank-holder 21, which is actuated by springs 22 to press the blank forwardly against the stops 20. When the machine is ready to receive the blank, a rod 23, having arms 24 connected with the stop-pins, is oscillated, as hereinafter explained, to retract the latter against the tension of their actuating-springs 25, when the blank is pressed forwardly by the blank-holder 21 to the bending-rolls 26, 27, and 28, by means of which the blank is bent into cylindrical form around the head-shaft 1. As the blank leaves the bending-rolls one of its end edges enters the annular space between the pipe-holder sleeve 29 and clamping-collar 30, and the other end edge is at the same time engaged in the space between the open head-collar 31 and the shaft 1, the blank being guided by the collars around the shaft, so that as the rear edge of the blank leaves the bending-rolls it springs upwardly and laps over the front edge, which has then completed the circuit of the shaft. The pipe-holder 32, to which the sleeve 29 and collar 30 are secured, is then moved forwardly to force the front end of the cylindrical blank or pipe through the head-collar 31. It will be observed that a lever 33 is connected with clamping-lips 34 of the collar 30 by means of links 35. During the initial forward movement of the pipe-holder above referred to this lever engages a guide 36, projecting from the bed-frame 37, which actuates the lever to draw the collar 30 tightly around the rear end of the pipe, clamping the same rigidly upon the sleeve 29. The upward movement of the lever 33 brings it into forcible contact with a punch 38, carried by the pipe-holder, and the movement of the lever is communicated to the punch to drive the latter inwardly, as shown by dotted lines in Fig. 26, and thus indent the overlapping portions of the pipe at its rear end. The dent thus formed prevents the end of the pipe from spreading after its discharge from the machine. The lever 33 is held in the raised or clamping position by means of a bent spring or catch 39, Figs. 25 and 26, until after the discharge of the completed elbow. The clamping-collar having been closed and the pipe-holder having completed its initial forward movement, the pipe is held thereby in position for crimping. The head-collar 31, which normally projects over the joint between the head and shaft end, is drawn rearwardly and the crimping-jaws 12 and 13 are closed about the pipe and force the latter inwardly in the space between the head and shaft end, the indentation being deepest on the side opposite the lug 10, and therefore causing the pipe to bend in that direction. The jaws being withdrawn, the head-collar 31 is moved forwardly over the crease or crimp in the pipe and clamped thereon, and the head is then drawn forcibly toward the shaft end to flatten or press together the sides of the interposed crease. The shaft then performs a single complete revolution, while the pipe is held from turning by the holder 32 and collars 29 and 30, respectively, the creased portion being discharged from between the head and shaft end over the lug 10, which folds the inwardly-projecting plait over upon the interior surface of the pipe, as illustrated in Fig. 13. Owing to the spiral trend of the opposing faces of the shaft end and head, it is obvious that the plait or crease in the pipe must have a similar trend or pitch, and as the shaft is rotated a forward movement is communicated therefrom through the spiral plait to the pipe and pipe-holder, so that the folded plait discharged over the lug 10 will not register with the joint between the head and shaft end, but will be advanced a distance equal to the spiral pitch of the plait or of the end face of the shaft. The pipe is then pushed forwardly by the pipe-holder for a short distance and the operation of crimping, flattening the plait or crease, and folding the same is repeated until a sufficient number of plaits or creases have been produced to form a right-angled elbow, when the forward movement of the pipe-holder 32 brings the lever 33 into contact with a guide 40, which releases it from the catch 39 and opens the clamping-collar 30, thus releasing the finished elbow. The pipe-holder 32 is then withdrawn to its original position for the reception of the succeeding blank, and during its rearward movement a guide 41 carried thereby engages under the free end of a lever 42, which is connected with the rod 23 and lifts the lever to oscillate the rod and retract the stops 20, thus releasing the succeeding blank. The lever 42 is provided with a one-way hinge-joint 43, which permits the free end of the lever to be depressed by downward pressure exerted by the guide 41. It will be observed that owing to the diagonal position of the guide upon the pipe-holder the forward movement of the latter causes the raised front end of the guide to impinge on the upper surface of the free end of the lever 42, and as the joint 43 permits the end of the lever to swing downwardly the guide passes over it without actuating the main portion of the lever. When the pipe-holder moves rearwardly, the lower rear end of the guide impinges on the under side of the end of the lever, and the guide then lifts the lever upon it to retract the stops 20, as heretofore explained. The jointed end of the lever is normally held in a horizontal position adapted to contact with the guide by means of a spring 43ª.

Referring now more particularly to the actuating mechanism, 44 is a driving-shaft provided with a pulley 45, through which motion is communicated to the machine from the source of power. The motion of the shaft 44 is communicated continuously to the bending-rolls 26 and 27 through the gear-wheels 46, 47, 48, and 49, shaft 50, pulley 51, belt 52, pulley 53, and gear-wheels 54 and 55, the latter being fixed to the rolls. The roll 28 runs idle. The initial movement of the pipe-holder 32 is communicated to it from the shaft 50 through the miter-gears 56 and 57, shaft 58, sleeve 178, and crank 59, the latter being adapted to engage a downwardly-projecting arm 60 of the pipe-holder 32 when the latter has completed its rearward movement and push the pipe-holder forwardly preparatory to crimping the pipe.

The crimping-jaws are actuated by a cam 61, adjustably mounted upon a shaft 62 and secured to rotate therewith by a suitable spline 63, motion being communicated to the shaft 62 from the gear-wheel 47 through the sliding clutch 64, shaft 65, and gear-wheels 66, 67, and 68, the latter being fast on the shaft 62.

The jaws 12 are pivotally secured at 15 to a depending jaw-actuating bar 69, which projects downwardly through suitable guides in the frame into the path of the cam when the latter is adjusted in its operative position, as hereinafter explained.

70 is an antifriction-roller located at the lower end of the bar 69 for contact with the cam. When the cam is in its operative position, the movement of its supporting-shaft 62 brings it first into contact with a lever 71, which is pivoted to the frame at 72, with its long arm 73 engaged in a fork 74 in the lower end of a lever 75, which is fulcrumed at 76 and extends upwardly through the machine-frame. The lever 75 is forked at its upper end and connected to the head collar or clamp 31 on both sides by pins 77, so that the motion of the cam is communicated through the levers 71 and 75 to the head-collar 31 to draw the same rearwardly and uncover the joint between the head 3 and shaft end 2 preparatory to the operation of the crimping-jaws. The continued movement of the cam brings it into contact with the roller 70 and forces the bar 69 upwardly, thus causing the crimping-jaws to move inwardly to crimp or crease the pipe, as heretofore explained. The cam is of such shape as to remain in contact with the lever 71 until the jaws are also actuated.

To retract the jaws after the cam has moved past the bar 69, I have provided an elbow-lever, Fig. 4, which is pivoted to the frame at 78, with one arm 79 engaging a pin 80, projecting from the bar 69. The upward movement of the bar 69 oscillates the lever to swing the other arm 81 into the path of the cam, so that the latter as it moves past the bar 69 engages and actuates the arm 81 to restore it to its normal position and retract the crimping-jaws through the medium of the arm 79, pin 80, and bar 69. The jaws being restored to their normal position, the head-collar 31 is moved forwardly over the seam by means of a spring 82, and on completing its revolution the cam is shifted upon the shaft 62 out of the plane of the bar 69 until it is again desired to actuate the jaws to form the next succeeding crease or plait. In the construction shown the cam is shifted once during each revolution of the shaft 62, moving alternately to the operative and inoperative position with the successive revolutions of the shaft.

The mechanism for shifting the cam is best shown in Figs. 6 to 9, inclusive, taken with Figs. 18 and 21. A cam-hub 83 is provided with an annular groove 84, in which studs 85 of a stirrup-shaped shifting-lever 86 are engaged. A rod 87 is secured to one end of this lever and connected with the machine-frame by a spring 88, which tends to hold the lever 86, with the cam, in its forward or inoperative position. The rear end of this rod 87 is, however, secured to an oscillatory shifting plate 89, which is provided with an arm 90, adapted to be engaged and actuated by a pin 91, projecting from the gear-wheel 68 on the rear end of the shaft 62, whereby the motion of the pin 91 may be communicated to the cam 61, through the arm 90, shifting plate 89, rod 87, and shifting-lever 86, to draw the cam backwardly into operative position. When the cam is in such position, the pin 91 will obviously pass the arm 90 without engaging the same.

In order that the cam may be held in either position of adjustment until it has performed a complete revolution with the shaft 62, the hub 83 is provided with annular guide-channels 92 and 93, in which a spring-actuated holding-pin 94 is adapted to engage, a cross-channel 95 being provided in the intervening rib 96 to permit the pin to shift from the channel 92 to the channel 93 when the cam is drawn backwardly, as above explained. The construction is such that the holding-pin 94 is in position to enter the cross-channel 95 at the same time that the cam-adjusting pin 91 engages the arm 90. The holding-pin 94 having passed into the guide-channel 93, it holds the cam in its operative position during one revolution of the shaft 62, as above stated, when a switch 97, located in the channel and pivotally secured to the base thereof, is carried by the rotation of the shaft under the pin 94 and serves as a wedge to force the pin 94 backwardly out of the channel 93, the rear portion of the switch 97 being of a thickness corresponding with the depth of the channel, as illustrated in Figs. 7 and 8. Therefore as the switch pushes under the pin 94 the latter is pushed backwardly against the tension of its actuating-spring until the switch reaches a position with the lower end of the pin bearing upon its thicker portion, when the tension of the spring 88 retracts the rod 87 and actuates the shifting-lever 86 to move the cam to its inoperative position, the holding-pin 94 slipping off from the switch 97 over the intervening rib 96 into the channel 92 at a point slightly in advance of the cross-channel 95, so that the backward movement of the rod 87 will not be prevented by contact of the arm 90 with the adjusting-pin 91. The holding-pin 94 then remains in the channel 92 during the succeeding revolution of the shaft 62, when it is again shifted into the channel 93 by the action of the pin 91, the switch 97 being formed to oscillate away from the cross-channel 95, as shown in Fig. 18, to permit the free passage of the holding-pin. 98 is an arm projecting from the shifting-lever in a position to engage against and push the switch into position to receive the holding-pin 94 and lift it out of the channel, as above explained.

The mechanism for pressing together the sides of the plait formed in the pipe by the crimping-jaws is operated from a gear-wheel 100, which is actuated from the gear-wheel 68 and is best shown in Fig. 6 and Figs. 17 to 21. The backward motion of the rod 87 when the latter is actuated by the spring 88 to shift the cam to its inoperative position is communicated to a clutch 101 through the plate 89, dog 102, slotted lever 103, pin 104, and clutch-actuating lever 105 to couple the gear 100 with the shaft 106. The motion of the shaft 106 is communicated to close the head-collar 31 upon the pipe, Figs. 19 and 20, through the miter-gears 109 and 110, shaft 111, crank 112, tooth 113, crank 114, rod 115, bell-crank 116, rod 117, bell-crank 118, link 119, lever 120, links 121, and clamping-arms 122, the latter being hinged together at 123. The links 121 are arranged to pass each other and are secured to the lever 120 in such a manner that when the clamping-arms are closed the link-coupling 124 will be in a position substantially on or a little beyond the line of centers, thus locking the clamp in its closed position until the lever 120 is actuated in the opposite direction. The lever 120 is extended upwardly and provided with a handle 125, by means of which it may be manually operated. The continued movement of the crank 112 brings it into contact with the lower end of the lever 126, forcing the latter backwardly and communicating a backward motion to the head-rod 5 through the link 127 and lever 128 to draw the head 3 forcibly against the shaft end 2, thus pinching the sides of the inwardly-projecting pipe-crease together. The continued movement of the crank 112 brings it into contact with a pin 129 and communicates motion to the clutch 101 to uncouple the gear 100 from the shaft 106 through said pin 129, lever 130, and clutch-lever 105. A spring 190 is adapted to retract the lever after the crank 112 has moved out of contact with the pin 129. It will be observed that when the lever 126 is pushed backwardly by the crank 112 it actuates a lever 131 to push a bar 132 forwardly in suitable bearings 133, the front end of the bar 132 being thus brought into a position to be engaged by an arm 134, depending from a rod or shaft 135, Fig. 21, to which the crank-plate 89 is secured. When the jaw-actuating cam 61 is shifted to its operative position through the medium of the gear-wheel 68, pin 91, arm 90, crank-plate 89, and the other connections heretofore described, the motion of the crank-plate is also communicated, Fig. 19, to the lever 126 through the shaft 135, arm 134, bar 132, and lever 131 to push the lower end of the lever 126 forwardly, thus actuating the rod 5 and head 3 through the intervening connections to separate the head from the shaft end. Motion is also simultaneously communicated to release the clamping-arms 122 of the head-collar 31 through the lever 126, tooth 113, crank 114, and the intervening connections heretofore described. I have also provided the bar 132 with a catch 136, which actuates a lever 137 and push-rod 138 to assist in oscillating the bell-crank 116 to release the clamping-arms 122.

As heretofore stated, after the sides of the pipe crease or plait have been flattened or pressed together by the action of the rod 5 in drawing the head 3 against the shaft end 2 the shaft and head are rotated to discharge the creased portion of the pipe from between them over the lug 10. This movement is accomplished, Fig. 17, by means of a spring-actuated coupling-pin 139, supported from the gear-wheel 67 by a lever 140 and operating through guide-brackets 141 and 142, projecting from the gear-wheel. The actuating-spring 143 is located between the lower bracket 141 and a cross-pin 143$^a$ and tends to drive the coupling-pin in the direction of the shaft. A socket 144 is provided in the shaft 1, in which the pin 139 is adapted to engage, whereby the shaft 1 and gear-wheel 67 may be coupled together. It will be observed, however, that a lever 145 is provided with a lug 146, projecting in the path of the lever 140, whereby the latter on coming in contact with the lug 146 will be lifted to withdraw the pin 139 from the socket 144 and permit the shaft 1 to come to rest, this operation being arranged to take place when the lug 10 on the shaft end 2 is uppermost. The pin 139 on being released from the socket 144 rides upon the surface of the shaft 1 until again permitted to enter the socket.

When the shifting-lever 86 is actuated to shift the jaw-actuating cam to its inoperative position, the motion of such lever is communicated to the lever 145, Figs. 1, 17, and 18, through a lever 147 and connecting-rod 148 to withdraw the lug 146 from the path of the clutch-pin lever 140, so that as the pin 139 registers with the socket it enters the latter and rotates the shaft at the same speed as that of the shaft 62, both being actuated through the gear-wheel 67 and the gear-wheels 67 and 68 being of equal size. As soon, however, as the shifting-lever 86 is actuated to adjust the cam 61 to its operative position a reverse movement is communicated to the lever 145 and the lug 146 readjusted in a position to engage the clutch-pin lever 140 and lift the pin out of its socket.

As heretofore explained, the cam 61 is shifted once during each revolution of the shaft 62, moving alternately to its operative and inoperative position. It is therefore obvious that the shaft 1 will be set in motion during each alternate revolution of the shaft 62 (when the cam 61 is inoperative) and will come to rest during the intermediate revolution, (when the cam is operative.) The position of the clutch-pin 139 upon the gear-wheel 67 is such as to allow a sufficient interval after the shifting of the cam and consequent adjustment of the lug 146 before the clutch-pin will register with the shaft-recess to permit the seam to be flattened and the lever 126 released from the pressure of the crank 112. The same interval is also allowed after the cam 61 is adjusted backwardly to its operative position for the shaft 1 to complete its revolution and come to rest before the cam actuates the crimping-jaws.

The mechanism for actuating the pipe-holder in the intervals between the successive movements of the crimping-jaws is best shown in Figs. 1 and 2. The pipe-holder is provided with rearwardly-projecting rack-bars 149, which are adapted to slide in ways 150. An intermittent forward motion is communicated to the racks and pipe-holder from a sliding rod 151 through a pawl 152, ratchet 153, gear-wheels 154 and 155, shaft 156, and rack-actuating gears 157. The rod 151 is provided at its rear end with a depending catch 158, which is adapted to be engaged by a spring-supported latch 159, pivotally secured to the upper end of a lever 160, the lower end of which is loosely connected with the rod 5, as shown in Figs. 6 and 17. When the rod 5 is drawn rearwardly to flatten the pipe-crease, as heretofore explained, the upper end of the lever 160 moves forwardly and the latch 159 snaps past the catch 158. With the reverse movement of the rod 5 the pressure of the latch 159 upon the catch 158 draws the rod 151 rearwardly, the pawl 152 sliding freely over the ratchet-teeth of the wheel 153. A reverse movement is then imparted to the rod 151 by means of a lug 162, carried by the gear-wheel 67, which lug is provided with an angular face adapted to engage a depending arm 163 of the rod 151 and push the latter forwardly, this motion of the rod 151 being communicated to the pipe-holder through the pawl 152, ratchet 153, and the intervening gears and rack-bars above mentioned. The lug 162 is so positioned on the gear-wheel 67 as to engage the arm 163 and actuate the pipe-holder as the shaft 1 completes its rotation and after the clamping-arms 122 have released the head-collar 31. It will be understood that as the pipe-holder is clamped to the pipe continuously until the elbow is completed it will be drawn forwardly to a slight extent when the shaft 1 is rotated to fold the pipe-crease and the creased portion is discharged from the spiral opening between the head 3 and shaft end 2, this action being similar to that of a screw. The movement of the rod 151 is therefore gaged to actuate the pipe-holder and pipe sufficiently to bring the latter into a position for the formation of the next crease after allowing for the forward movement of the pipe and pipe-holder when the preceding crease is folded.

When the elbow is completed, a stud 164, Fig. 2, projecting from one of the rack-actuating gears 157, engages a lever 165, which is connected with the pawl 152 by a link 166 and fork 167 and communicates motion through said lever, link, and fork to lift the pawl out of engagement with the ratchet 153, the pawl being then held in its raised position by a spring-catch 168, which engages in a notch 169 in the pawl. The clamp-holding lever 33 of the pipe-holder simultaneously engages the guide 40, Fig. 16, and is depressed thereby to release the clamping-collar 30, as heretofore explained, when the pipe-holder is retracted to its extreme rearward position by a weight 170, connected with the pipe-holder by a flexible connection 171. When the pipe-holder has completed its rearward movement, the stud 164 engages underneath the lever 165 and communicates a reverse movement to the pawl 152, releasing the pawl from the catch 168 and permitting it to reëngage the ratchet 153 preparatory to the next forward movement of the pipe-holder.

Mechanism for automatically starting the machine when ready for the construction of an elbow or for stopping it when the same is completed is illustrated in Figs. 22, 23, and 24, the machine being controlled in this respect by means of the clutch 64. It will be observed that the clutch is operated by a fork 172 of a lever 173, the lower end of which is connected with a rod 174, extending to the front end of the machine and provided with a handle 175, by means of which the clutch may be manually adjusted. The rod 174 is provided with an arm 176, which when the clutch is uncoupled occupies a position in the path of a crank 177, projecting from a loose sleeve 178, located on the cross-shaft 58. The sleeve is adapted to be coupled to the shaft by a key 180, which extends through an aperture therein and is adapted to register with a socket 181 in the shaft 58, but is held normally out of engagement therewith by means of a lever 182, pivotally secured to the sleeve, with one end attached to the key 180 and the other end adapted to engage under the end of a post 183, the upper end of which is connected with an elbow-lever 184. The blank-holder 21 is provided with an arm 185, which is arranged to engage one arm of the lever 184 when the blank-holder is drawn out for the insertion of a blank, this motion of the blank-holder being communicated to the post 183 through the lever 184 to raise the post and release the lever 182 from the lower end thereof, at the same time permitting the key 180 to enter the socket 181 and lock the sleeve to the shaft 58. Motion is then communicated from the shaft 50 to actuate the clutch 64 and couple the shaft 65 to the gear-wheel 47 through the bevel-gears 56 and 57, cross-shaft 58, sleeve 178, crank 177, arm 176, rod 174, and clutch-shifting lever 173. When the sleeve 178 has completed its revolution, the lever 182 reëngages under the end of the post 183, which depresses the engaged end of the lever and lifts the key out of its socket, thus permitting the sleeve to come to rest. It will be understood that the required movement of the lever 182 is very slight. Therefore a slight bevel on the upper surface of the lever or the lower end of the post 183 will permit the passage of the lever under the post, the lever being depressed by the weight of the post and its connections. As the movement of the lever is an extremely-short one, the required bevel or incline of its upper surface or of the lower end of the post is too slight to appear in the drawings, being merely sufficient to cause the parts to yield vertically when brought in contact with each other in an obvious manner.

When the elbow is completed, the final forward movement of the pipe-holder 32 brings its arm 60 into contact with a lever 188, which communicates its motion to open the clutch 64 through the rod 174 and clutch-shifting lever 173, thus stopping all parts of the machine except the bending-rolls, through which the next blank is then fed. The rearward movement of the pipe-holder actuates the stop-pins 20, by means of the guide 41 and lever 42, to release the blank from the feed-table, as above explained. 189 is a screw for adjusting the feed-table 19, the curvature of the blank being regulated by the angle of the feed-table with reference to the bending-rolls.

Reviewing the operation of the machine and assuming that the driving-pulley is connected with a source of power and the clutch 64 uncoupled from the gear-wheel 47, the first blank is fed over the table 19 without inserting it in the blank-holder 21, the stop-pin lever 42 being manually actuated to elevate the stop-pins and permit the blank to pass to the bending-rolls. The latter being continuously actuated from the driving-pulley, the blank will be at once wound upon the shaft 1, with its front and rear ends loosely engaged by the clamping-collars 31 and 30 of the head and pipe-holder. A second blank is then placed upon the feed-table, the blank-holder 21 being drawn outwardly to engage the blank between it and the stop-pins. The movement of the blank-holder is communicated to couple the sleeve 178 to the cross-shaft 58, as above explained, and the initial forward movement of the pipe-holder is then communicated to it from the cross-shaft 58 through the sleeve 178 and crank 59, when the lever 33 of the pipe-holder-clamping collar 30 is engaged by the guide 36 and lifted to clamp the rear end of the pipe securely to the pipe-holder 32, the pipe being simultaneously dented and pushed forwardly through the head-collar in a position to be acted upon by the crimping-jaws in producing the first crease. The crank 177 then actuates the arm 176, which communicates its motion to the clutch 64 to couple the shaft 65 with the gear-wheel 47, after which and on completion of the revolution of the crank the key 180 is withdrawn and the sleeve and crank permitted to come to rest. The gear-wheel 47 and shaft 65 being coupled together, motion is then communicated from the latter through the cam 61 to retract the head-collar 31 and actuate the crimping-jaws to form the first pipe-crease and then retract the jaws, after which the head-collar is moved forwardly over the pipe-crease by the reaction of the spring 82, which also communicates its motion through the shifting-lever 86 to the lever 145 and lug 146 to permit the coupling of the shaft 1 with the gear-wheel 67 and simultaneously actuates the clutch 101 to couple the gear-wheel 100 with the shaft 106. The motion of the gear-wheel 67 is then communicated through the shaft 106 and intervening mechanism to successively clamp the head-collar upon the pipe, draw the head forcibly against the shaft end to flatten the inwardly-projecting pipe crease or plait, and uncouple the shaft 106 from the gear-wheel 100. As soon as the pipe-crease is flattened, as above stated, the coupling-pin 139, carried by the gear-wheel 67, enters the socket in the shaft 1 and rotates the latter to fold the plait on the inner surface of the pipe, after which the cam is shifted to its operative position by means of the pin 91, carried by the gear-wheel 68, which simultaneously communicates its motion through the arm 134 and intervening connections to open the clamping-arms of the head-clamp, push the head-rod 5 forwardly to swing the head 3 outwardly from the shaft end, and through the shifting-lever and its connections to readjust the lever 145 and lug 146 in position to uncouple the shaft 1 and gear-wheel 67. The continued movement of the gear-wheel 67 then brings the coupling-pin lever into contact with the lug 146 and uncouples the shaft, the gear-wheel lug 162 then actuating the pipe-holder through the rod 151 and intervening pawl-and-ratchet mechanism. The operation of crimping the pipe and flattening and folding the plait is successively repeated until the elbow is completed, when the pipe-holder clamp-lever is depressed by the guide 40 to release the elbow, as heretofore explained, and the clutch 64 simultaneously actuated to uncouple the shaft 65 and gear 47, the pawl 152 being at the same time raised and the pipe-holder retracted to its original position by the weight 170. The rearward movement of the pipe-holder is communicated through the actuating-lever of the feed-table stop-pins to release the next succeeding blank, which is then fed into the bending-rolls by the blank-holder. The machine then awaits the action of the operator in inserting the next blank in the holder 21, from which the succeeding movements of the machine are controlled, as above explained.

Having thus described my invention, what I claim as new, and desire to secure by Letters Patent, is—

1. In a stovepipe-elbow machine, the combination of a shaft having one end thereof formed with a spiral pitch; and a head adjustably secured to the shaft end.

2. In a stovepipe-elbow machine, the combination of a shaft; a head adjustably secured to one end thereof; and means for actuating the head upon said hinge; the opposing faces of the shaft end and head being formed with a spiral pitch.

3. In a stovepipe-elbow machine, an adjustable head secured to one end thereof at one side of the center of the shaft; a lug projecting from the shaft end into a recess in the head, and means for actuating the head upon said hinge; the opposing surfaces of the head and shaft being formed with a spiral pitch terminating in said lug.

4. In a stovepipe-elbow machine, the combination of a shaft having one end formed with a spiral pitch; a head adjustably secured to said shaft end at one side of the center; and means for alternately oscillating said head and rotating the shaft and head.

5. In a stovepipe-elbow machine, the combination of a shaft; a head adjustably secured to one end thereof, the opposing faces of the head and shaft end being formed with a spiral pitch; means for creasing a pipe cylinder in the space between the shaft and head; and means for rotating the shaft with the head.

6. In a stovepipe-elbow machine, the combination of a shaft; a head adjustably secured to one end thereof at one side of the shaft center; and a lug projecting from the shaft and engaged in a recess in the head.

7. In a stovepipe-elbow machine, the combination of a shaft; a head adjustably secured to one end thereof at one side of the shaft center; a bar, angular in cross-section, projecting from the shaft and loosely engaging a socket in the head; means for creasing a pipe-cylinder in the space between the shaft and head; and means for rotating the shaft and head.

8. In a stovepipe-elbow machine, the combination of a shaft; a head adjustably secured to one end thereof at one side of the shaft center; means for adjusting the head upon said hinge to and from the shaft end; means for holding a sheet-metal cylinder non-rotatably on said shaft and head; and means for rotating the shaft.

9. In a stovepipe-elbow machine, the combination of a shaft having one end face formed with a spiral pitch; a head adjustably secured thereto, with the opposing face thereof also formed with a spiral pitch; means for adjusting said head with reference to the shaft end; a non-rotatable pipe-holder; and means for rotating the shaft.

10. In a stovepipe-elbow machine, the combination of a shaft; a head adjustably secured to one end thereof; a non-rotatable pipe-holder adapted to hold a section of pipe over said shaft and head; means for crimping the pipe between the shaft end and head; and means for rotating the shaft; the opposing faces of the head and shaft end being provided with a spiral pitch.

11. In a stovepipe-elbow machine, the combination of a shaft; a head adjustably secured to one end thereof; a lug projecting from the shaft and engaged in a socket in the head; means for creasing the pipe between the head and shaft; and means for rotating the shaft.

12. In a stovepipe-elbow machine, the combination of a shaft; a head adjustably secured to one end thereof; a non-rotatable pipe-holder; means for creasing the pipe between the head and shaft; and means for rotating the shaft.

13. In a stovepipe-elbow machine, the combination of a shaft; a head adjustably secured to one end thereof; a lug projecting from the shaft and engaged in a socket in the head; a hinge connecting said head and shaft between the lug and the center line of the shaft and head; and means for rotating the shaft.

14. In a stovepipe-elbow machine, the combination of a hollow shaft; a head adjustably secured to one end thereof; a rod extending through said shaft and secured to the head by a hinged connection; a lug projecting from the shaft and engaging a socket in the head; a hinge securing said shaft and head together between the lug and shaft end; means for actuating said rod to oscillate the head upon the shaft end; and means for rotating the shaft.

15. In a stovepipe-elbow machine, the combination of a hollow shaft; a head adjustably secured to one end thereof, with the opposing faces of the head and shaft end provided with a spiral pitch; a rod extending through the shaft and secured to said head; a hinge securing the head to the shaft end at one side of its center; means for actuating said rod longitudinally; and means for rotating the head.

16. In a stovepipe-elbow machine, the combination of a shaft; a head adjustably secured thereto; crimping-jaws adapted to enter the space between the head and shaft end; means for oscillating the head upon the shaft end; and means for rotating the shaft.

17. In a stovepipe-elbow machine, the combination of a shaft; a head adjustably secured thereto; crimping-jaws adapted to enter the space between the head and shaft end; means for oscillating the head upon the shaft; and means for rotating the shaft, the opposing surfaces of the head and shaft end being formed with a spiral pitch.

18. In a stovepipe-elbow machine, the combination of a shaft; a head adjustably secured thereto with the opposing faces of the head and shaft end formed with a spiral pitch; a hinge securing the head to the shaft end at one side of the center line; crimping-jaws adapted to register with the opening formed by oscillating the head upon said hinge; means for actuating the crimping-jaws; and means for rotating the shaft.

19. In a stovepipe-elbow machine, the combination of a shaft; a head hinged thereto at one side of the center line; a set of crimping-jaws arranged to enter the space between the head and shaft, when the latter is oscillated on said hinge; a lug projecting from the shaft end and entering a recess in the head; and means for successively actuating the crimping-jaws and rotating the shaft and head.

20. In a stovepipe-elbow machine, the combination of a shaft; a head hinged thereto at one side of the center line; a set of crimping-jaws arranged to enter the space between the head and shaft when the latter is oscillated on said hinge; a lug projecting from the shaft end and entering a recess in the head; and means for successively actuating the crimping-jaws and rotating the shaft and head, the opposing faces of the shaft and head being provided with a spiral pitch.

21. In a stovepipe-elbow machine, the combination of a shaft; a head hinged thereto at one side of the center line; a set of crimping-jaws arranged to enter the space between the head and shaft, when the latter is oscillated on said hinge; a lug projecting from the shaft end and entering a recess in the head; a collar adapted to be shifted longitudinally of said shaft, to cover the joint between the head and shaft end; and means for successively actuating the crimping-jaws and rotating the shaft and head.

22. In a stovepipe-elbow machine, the combination of a shaft; a head hinged thereto at one side of the center line; a set of crimping-jaws arranged to enter the space between the head and shaft, when the latter is oscillated on said hinge; a lug projecting from the shaft end and entering a recess in the head; a collar adapted to be shifted longitudinally of said shaft, to cover the joint between the head and shaft end; and means for successively actuating the crimping-jaws and rotating the shaft and head, the opposing faces of the shaft and head being provided with a spiral pitch.

23. In a stovepipe-elbow machine, the combination of a shaft; a head hinged thereto at one side of the center line; a set of crimping-jaws adapted to register with the joint formed by the head and shaft end; a collar adapted to be shifted longitudinally of the shaft, to cover the joint between the head and shaft end; and means for successively actuating the crimping-jaws, collar, head and shaft.

24. In a stovepipe-elbow machine, the combination of a shaft; a head hinged thereto at one side of the center line, with the opposing faces of the head and shaft end formed with a spiral pitch; a set of crimping-jaws adapted to register with the joint formed by the head and shaft end; a collar adapted to be shifted longitudinally of the shaft, to cover the joint between the head and shaft end; and means for successively actuating the crimping-jaws, collar, head and shaft.

25. In a stovepipe-elbow machine, the combination of a shaft; a head hinged thereto at one side of the center line; a set of crimping-jaws adapted to register with the joint formed by the head and shaft end; a collar adapted to be shifted longitudinally of the shaft, to cover the joint between the head and shaft end; a pipe-holder coöperative with said collar, to hold the pipe in position for the formation of the elbow; and means for successively actuating the crimping-jaws, collar, head and shaft.

26. In a stovepipe-elbow machine, the combination of a shaft; a head hinged thereto at one side of the center line, with the opposing faces of the head and shaft end formed with a spiral pitch; a set of crimping-jaws adapted to register with the joint formed by the head and shaft end; a collar adapted to be shifted longitudinally of the shaft, to cover the joint between the head and shaft end; a pipe-holder coöperative with said collar, to hold the pipe in position for the formation of the elbow; and means for successively actuating the crimping-jaws, collar, head and shaft.

27. In a stovepipe-elbow machine, the combination of a shaft; a head adjustably secured thereto, with the opposing faces of the head and shaft end formed with a spiral pitch; means for oscillating the head upon the shaft end; crimping-jaws adapted to enter the space between the head and shaft end; an open collar adapted to be shifted longitudinally to cover the joint between the head and shaft end; clamping-arms adapted to engage said collar; a pipe-holder coöperative with said collar, to hold the pipe in position upon said head and shaft; and means for successively actuating the crimping-jaws, head, collar, clamping-arms and shaft.

28. In a stovepipe-elbow machine, the combination of a shaft; a head adjustably secured thereto, with the opposing faces of the head and shaft end formed with a spiral pitch; a lug projecting from the shaft and engaged in a slot in said head; means for oscillating the head upon the shaft end; crimping-jaws adapted to enter the space between the head and shaft end; an open collar adapted to be shifted longitudinally, to cover the joint between the head and shaft end; clamping-arms adapted to engage said collar; a pipe-holder coöperative with said collar to hold the pipe in position upon said head and shaft; and means for successively actuating the crimping-jaws, head, collar, clamping-arms and shaft.

29. In a stovepipe-elbow machine, the combination of a shaft; a head adjustably secured thereto, with the opposing faces of the head and shaft end formed with a spiral pitch; a lug projecting from the shaft and engaged in a slot in said head; a hinge connecting the head and shaft end between the lug and the center line of the shaft; means for oscillating the head upon the shaft end; crimping-jaws adapted to enter the space between the head and shaft end; an open collar adapted to be shifted longitudinally to cover the joint between the head and shaft end; clamping-arms adapted to engage said collar; a pipe-holder coöperative with said collar, to hold the pipe in position upon said head and shaft; and means for successively actuating the crimping-jaws, head, collar, clamping-arms, and shaft.

30. In a stovepipe-elbow machine, the combination of a shaft; a head hinged to one end thereof at one side of the center line of the shaft, with the opposing faces of the head and shaft end formed with a spiral pitch; a pipe-holder adapted to hold the pipe upon said shaft and head; means for intermittingly actuating the pipe-holder; crimping-jaws adapted to register with the joint between the head and shaft end; and means for actuating said jaws to crimp the pipe in the intervals between the successive movements of the pipe-holder.

31. In a stovepipe-elbow machine, the combination of a shaft; a head hinged to one end thereof at one side of the center line of the shaft, with the opposing faces of the head and shaft end formed with a spiral pitch; a pipe-holder adapted to hold the pipe upon said shaft and head; means for intermittingly actuating the pipe-holder; crimping-jaws adapted to register with the joint between the head and shaft end; and means for successively actuating said jaws, head and shaft in the intervals between the successive movements of the pipe-holder.

32. In a stovepipe-elbow machine, the combination of a shaft; a head hinged to one end thereof at one side of the center line of the shaft, with the opposing faces of the head and shaft end formed with a spiral pitch; a pipe-holder adapted to hold the pipe upon said shaft and head; a clamp adapted to rigidly bind the pipe upon said holder; means for intermittingly actuating the pipe-holder; crimping-jaws adapted to register with the joint between the head and shaft end; and means for actuating said jaws to crimp the pipe in the intervals between the successive movements of the pipe-holder.

33. In a stovepipe-elbow machine, the combination of a shaft; a head adjustably secured to one end thereof and adapted to oscillate eccentrically thereon, the opposing faces of the head and shaft being formed with a spiral pitch; a pipe-holder adapted to hold the pipe upon said shaft and head; a clamp adapted to rigidly bind the pipe upon the pipe-holder; an open head-collar adapted to be shifted with respect to the joint between the head and shaft end; clamping-arms adapted to bind the head-collar around the pipe over said joint; crimping-jaws adapted to register with the joint between the shaft and head; means for intermittingly actuating the pipe-holder; and means for successively actuating the crimping-jaws, head-collar, clamping-arms, head and shaft in the intervals between the successive movements of the pipe-holder.

34. In a stovepipe-elbow machine, the combination of a shaft; a head adjustably secured to one end thereof and adapted to oscillate eccentrically thereon, the opposing faces of the head and shaft end being formed with a spiral pitch; a head-collar; a pipe-holder; a clamping-collar connected therewith; a set of bending-rolls arranged to bend a sheet-metal blank around the shaft, with its ends engaging under said collars; means for moving the pipe-holder forwardly; a lever for actuating said clamping-collar to secure the cylindrical blank to the pipe-holder; crimping-jaws adapted to register with the joint between the shaft and head; and means for rotating the shaft.

35. In a stovepipe-elbow machine, the combination of a shaft provided with an enlarged end; a head adjustably secured to the shaft end and adapted to oscillate eccentrically thereon, the opposing faces of the head and shaft end being provided with a spiral pitch; a head-collar; a pipe-holder; a clamping-collar connected therewith; a lever for actuating the clamping-collar; a punch carried by the pipe-holder and adapted to be actuated by the clamping-collar lever to dent the pipe engaged by said collar; crimping-jaws adapted to register with the joint between the head and shaft end; and means for rotating the shaft.

36. In a stovepipe-elbow machine, the combination of a shaft provided with an enlarged end; a head adjustably secured to the shaft end and adapted to oscillate eccentrically thereon, the opposing faces of the head and shaft being provided with a spiral pitch; a head-collar; a pipe-holder; a clamping-collar connected therewith; a set of bending-rolls adapted to bend a sheet-metal blank into cylindrical form around said shaft, with its ends engaging under said collars; a lever for actuating the clamping-collar; a punch carried by the pipe-holder and adapted to be actuated by the clamping-collar lever to dent the pipe engaged by said collar; crimping-jaws adapted to register with the joint between the head and shaft end; and means for rotating the shaft.

37. In a stovepipe-elbow machine, the combination of a shaft; a pipe-holder adjustably mounted thereon; a clamping-collar connected with the pipe-holder; a head-collar located at one end of the shaft; and a set of bending-rolls arranged to bend a sheet-metal blank into cylindrical form around said shaft, said collars being adapted to engage and guide the front and rear ends of said blank around the shaft and hold the cylinder thereto.

38. In a stovepipe-elbow machine, the combination of a shaft provided with an enlarged end, and having the end face formed with a spiral pitch; a head formed to fit said shaft end and hinged thereto at one side of the center; means for adjusting the head upon said hinge; a pipe-holder adjustably mounted upon the shaft; a clamping-collar connected with the pipe-holder; an adjustable head-collar adapted to cover the joint between the shaft and head; a set of bending-rolls adapted to bend a sheet-metal blank, into cylindrical form, around the shaft, in a position with the ends of such cylinder engaged by said collars; a lever for clamping the pipe-holder collar upon said cylinder; means for crimping the cylindrical pipe in the space between the head and shaft end; and means for actuating said head to flatten the crimped or creased portion of the pipe, and rotating said shaft to discharge such portion of the pipe from between the shaft and the head.

39. In a stovepipe-elbow machine, the combination of a shaft; a pipe-holder adjustably mounted thereon; a set of bending-rolls adapted to bend a sheet-metal blank around said shaft; a feed-table; blank-holding stops adapted to retain the blanks thereon; a spring-actuated blank-holder adapted to engage the blank between it and said stops; and means, carried by the pipe-holder, for retracting said stops during their rearward movement, and releasing the blanks, whereby the latter are permitted to enter the bending-rolls.

40. In a stovepipe-elbow machine, the combination of a shaft having one end formed with a spiral pitch on the end face; a head adjustably secured thereto; crimping-jaws adapted to register with the joint between the head and shaft end; a pipe-holder; a clamping device connected therewith; a feed-table; means for automatically feeding sheet-metal blanks therefrom, and bending the same into cylindrical form around said shaft; pawl-and-ratchet mechanism arranged to intermittingly actuate the pipe-holder; and means for successively actuating the crimping-jaws in the intervals between the successive movements of the pipe-holder.

41. In a stovepipe-elbow machine, the combination of a shaft having one end face formed with a spiral pitch; a head hinged thereto at one side of the center line of the shaft; a head-frame; a set of crimping-jaws secured to the head-frame and linked together so as to form an inwardly-moving toggle; an actuating-shaft; a jaw-actuating cam located thereon; and a sliding bar connected with said jaws and adapted to be actuated by said cam to close the jaws, said jaws being adapted to register eccentrically with the joint between the shaft and head.

42. In a stovepipe-elbow machine, the combination of a shaft having one end face formed with a spiral pitch; a head hinged thereto at one side of the center line of the shaft; a head-frame; a set of crimping-jaws secured to the head-frame and linked together so as to form an inwardly-moving toggle, adapted to register eccentrically with the joint formed by the head and shaft end; an actuating-shaft; a jaw-actuating cam located thereon; a sliding bar connected with said jaws and adapted to be actuated by the cam to close the jaws; and means for adjusting the head upon its hinge.

43. In a stovepipe-elbow machine, the combination of a shaft having one end face formed with a spiral pitch; a head hinged thereto at one side of the center line of the shaft; a head-frame; a set of crimping-jaws secured to the head-frame and linked together so as to form an inwardly-moving toggle, adapted to register eccentrically with the joint formed by the head and shaft end; an actuating-shaft; a jaw-actuating cam located thereon; a sliding bar connected with said jaws and adapted to be actuated by the cam to close the jaws; an elbow-lever connected with the jaws and adapted to be actuated by the cam to retract the jaws; and means for adjusting the head upon its hinge.

44. In a stovepipe-elbow machine, the combination of a shaft having one end face formed with a spiral pitch; a head hinged thereto on one side of the center line of the shaft; crimping-jaws adapted to register with the joint between the head and shaft end; a gear-wheel, loose on the rear end of said shaft and adapted to be coupled thereto; an actuating-shaft; a jaw-actuating cam located thereon; a gear-wheel on said actuating-shaft, meshing with the gear-wheel on the head-shaft; and means for temporarily coupling said last-mentioned gear-wheel to the head-shaft.

45. In a stovepipe-elbow machine, the combination of a head-shaft, having one end face formed with a spiral pitch; a head hinged thereto on one side of the center line of the shaft; crimping-jaws adapted to register with the joint between the head and shaft end; a head-shaft gear-wheel loose on said shaft, and adapted to be coupled thereto; an actuating-shaft; a jaw-actuating cam adjustably mounted thereon; a gear-wheel on said actuating-shaft, meshing with the gear-wheel on the head-shaft; means for adjusting said jaw-actuating cam alternately to an operative and inoperative position; and means controlled by said cam-adjusting mechanism for coupling and uncoupling the head-shaft and head-shaft gear-wheel.

46. In a stovepipe-elbow machine, the combination of a head-shaft, having one end face formed with a spiral pitch; a head hinged thereto on one side of the center line of the shaft; crimping-jaws adapted to register with the joint between the head and shaft end; a head-collar adapted to be adjusted to cover said joint; an adjustable pipe-holder coöperative with the head-collar in holding the elbow-pipe; an actuating-shaft; a jaw-actuating cam adjustably mounted thereon; means for adjusting said cam alternately to an operative and inoperative position; and means, controlled by the cam-adjusting mechanism, for actuating said head-collar, head and pipe-holder.

47. In a stovepipe-elbow machine, the combination of a head-shaft, having one end face formed with a spiral pitch; a head hinged thereto on one side of the center line of the shaft; crimping-jaws adapted to register with the joint between the head and shaft end; a head-collar adapted to be adjusted to cover said joint; clamping devices adapted to bind said collar upon the pipe engaged thereby; an adjustable pipe-holder coöperative with the head-collar in holding the elbow-pipe; an actuating-shaft; a jaw-actuating cam adjustably mounted thereon; means for adjusting said cam alternately to an operative and inoperative position; and means, controlled by the cam-adjusting mechanism, for actuating said head-collar, head-collar-clamping devices, head and pipe-holder.

48. In a stovepipe-elbow machine, the combination of a head-shaft, having one end face formed with a spiral pitch; a head hinged thereto on one side of the center line of the shaft; crimping-jaws adapted to register with the joint between the head and shaft end; a head-collar adapted to be adjusted to cover said joint; an adjustable pipe-holder coöperative with the head-collar in holding the elbow-pipe; clamping devices for said head-collar and pipe-holder; bending-rolls adapted to bend a sheet-metal blank into cylindrical form around the head-shaft; a feed-table; blank-holding stops therefor; a blank-holder adapted to feed the blanks to the bending-rolls; an actuating-shaft; a jaw-actuating cam adjustably mounted thereon; means for adjusting said cam alternately to an operative and inoperative position; and means, controlled by the cam-adjusting mechanism, for actuating said head-collar, clamping devices, head and pipe-holder.

49. In a stovepipe-elbow machine, the combination of a head-shaft, having one end face formed with a spiral pitch; a head hinged thereto on one side of the center line of said shaft; crimping-jaws adapted to register with the joint between the head and shaft end; an adjustable pipe-holder; a pipe-engaging clamp connected therewith; an actuating-shaft; a jaw-actuating cam adjustably mounted thereon; means for automatically adjusting said cam alternately to an operative and inoperative position at fixed intervals; means controlled by the cam-adjusting mechanism, for successively actuating the head, head-shaft and pipe-holder; and connections whereby the final movement of said pipe-holder is simultaneously communicated to uncouple the driving mechanism, pipe-engaging clamp, and the actuating mechanism of the pipe-holder.

50. In a stovepipe-elbow machine, the combination of a head-shaft, having one end face formed with a spiral pitch; a head hinged thereto on one side of the center line of said shaft; crimping-jaws adapted to register with the joint between the head and shaft end; an adjustable pipe-holder; a pipe-engaging clamp connected therewith; an actuating-shaft; a jaw-actuating cam adjustably mounted thereon; means for automatically adjusting said cam alternately to an operative and inoperative position at fixed intervals; means, controlled by the cam-adjusting mechanism, for successively actuating the head, head-shaft and pipe-holder; connections whereby the final movement of said pipe-holder is simultaneously communicated to uncouple the driving mechanism, pipe-engaging clamp, and the actuating mechanism of the pipe-holder; and a weight connected to the pipe-holder for retracting the same, when released from its actuating mechanism.

51. In a stovepipe-elbow machine, the combination with a head-shaft; of a pipe-holder provided with rearwardly-extending rack-bars; gear-wheels arranged to actuate the same; pawl-and-ratchet mechanism adapted to communicate an intermittent motion to said gear-wheels; and an arm carried by one of said gear-wheels, and arranged to respectively engage and disengage said pawl from the ratchet, as the pipe-holder completes its backward and forward movements.

52. In a stovepipe-elbow machine, the combination with a head-shaft; of a pipe-holder provided with rearwardly-extending rack-bars; gear-wheels arranged to actuate the same; pawl-and-ratchet mechanism adapted to communicate an intermittent motion to said gear-wheels; and an arm carried by one of said gear-wheels, and arranged to respectively engage and disengage said pawl from the ratchet, as the pipe-holder completes its backward and forward movements; together with a spring-catch, adapted to hold said pawl in either position of adjustment until actuated by the gear-wheel arm.

53. In a stovepipe-elbow machine, the combination with a head-shaft; a head hinged to one end thereof at one side of the center line of said shaft; a rod for oscillating the head upon said hinge; a gear-wheel adapted to actuate the shaft; a pipe-holder longitudinally movable on the head-shaft; rearwardly-extending rock-bars connected with the pipe-holder; pawl-and-ratchet mechanism and gear-wheels for actuating said racks; a latch carried by the head-actuating rod; connections adapted to communicate motion from said latch to retract said pawl; and an arm carried by the head-shaft gear-wheel, and adapted to communicate a forward motion to said pawl.

54. In a stovepipe-elbow machine, the combination of a pipe-holder; a feed-table provided with blank-holding stops; a spring-actuated blank-holder adapted to engage sheet-metal blanks between the same and said stops; mechanism for retracting said stops to release the blanks; and a guide carried by the pipe-holder, adapted to actuate the stop-retracting mechanism during the return movement of the pipe-holder.

55. In a stovepipe-elbow machine, the combination with a head-shaft; a pipe-holder; an open clamping-collar connected with the pipe-holder; an open head-collar; and a set of bending-rolls arranged to bend sheet-metal blanks around the head-shaft, said collars being arranged to engage the edges of said blanks and guide the same around the shaft.

56. In a stovepipe-elbow machine, the combination with a head-shaft, provided with an enlarged end; a pipe-holder adjustably mounted upon the head-shaft and provided with a pipe-holding collar; an open clamping-collar connected with the pipe-holder and cooperative with the pipe-holding collar; an open head-collar disposed about the enlarged end of said shaft; and a set of bending-rolls adapted to bend sheet-metal blanks around the head-shaft, with the ends engaging underneath said open collars and upon the pipe-holding collar and enlarged end of the shaft respectively; together with means for clamping said collars around the cylindrical ends of the pipe.

57. In a stovepipe-elbow machine, the combination of a head-shaft; a head hinged thereto at one side of the center line; a head-frame; a set of crimping-jaws located about the joint between the head and shaft end, and connected to each other and to the head-frame by a series of levers and links arranged to form an inwardly-moving toggle closing in the arc of a circle eccentric to that of the shaft and head.

58. In a stovepipe-elbow machine, the combination with a set of crimping-jaws connected to form an inwardly-moving toggle; of a bar connected with one or more of said jaws and adapted to actuate the same; an actuating-shaft; a jaw-actuating cam adjustably mounted thereon and adapted to engage and actuate said bar; and mechanism for automatically shifting said cam to and from its operative position with successive revolutions of the actuating-shaft.

59. In a stovepipe-elbow machine, the combination with a set of crimping-jaws connected to form an inwardly-moving toggle; of a jaw-actuating bar; an actuating-shaft; a cam adjustably mounted thereon and adapted to engage and actuate said bar; a hub connected with said cam, and provided with annular channels with a cross-channel connecting the same; a spring-actuated holding-pin adapted to engage in said channels; a switch located in one of the annular channels and arranged to lift the holding-pin out of the same; a shifting-lever for actuating said cam to adjust it alternately to its operative and inoperative positions; means for automatically actuating said shifting-lever in one direction, when the holding-pin is in registry with the cross-channel, and in the other direction when the pin is lifted by said switch.

In testimony whereof I affix my signature in the presence of two witnesses.

HERMANN SEKOWSKY.

Witnesses:
    JAS. B. ERWIN,
    LEVERETT C. WHEELER.